April 24, 1934.   L. HIRSCHHORN ET AL   1,955,808
COMBINATION TAG FEEDING AND CUTTING MECHANISM
Filed July 13, 1932   7 Sheets-Sheet 3
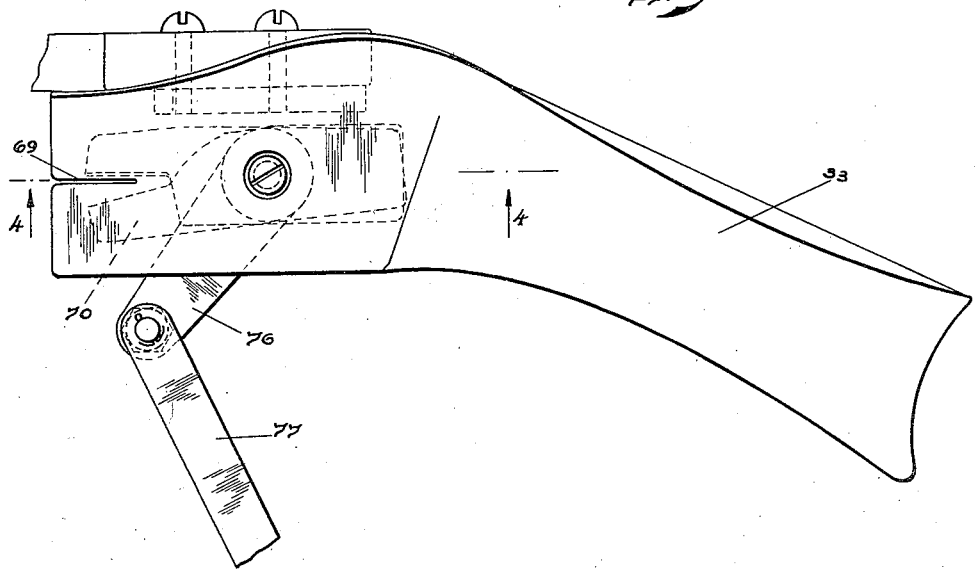
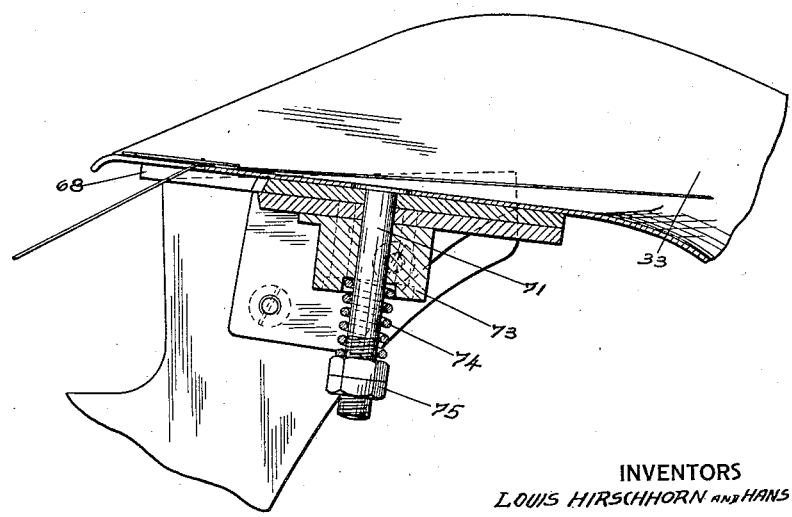
INVENTORS
LOUIS HIRSCHHORN AND HANS IRMSCHER
BY
ATTORNEYS

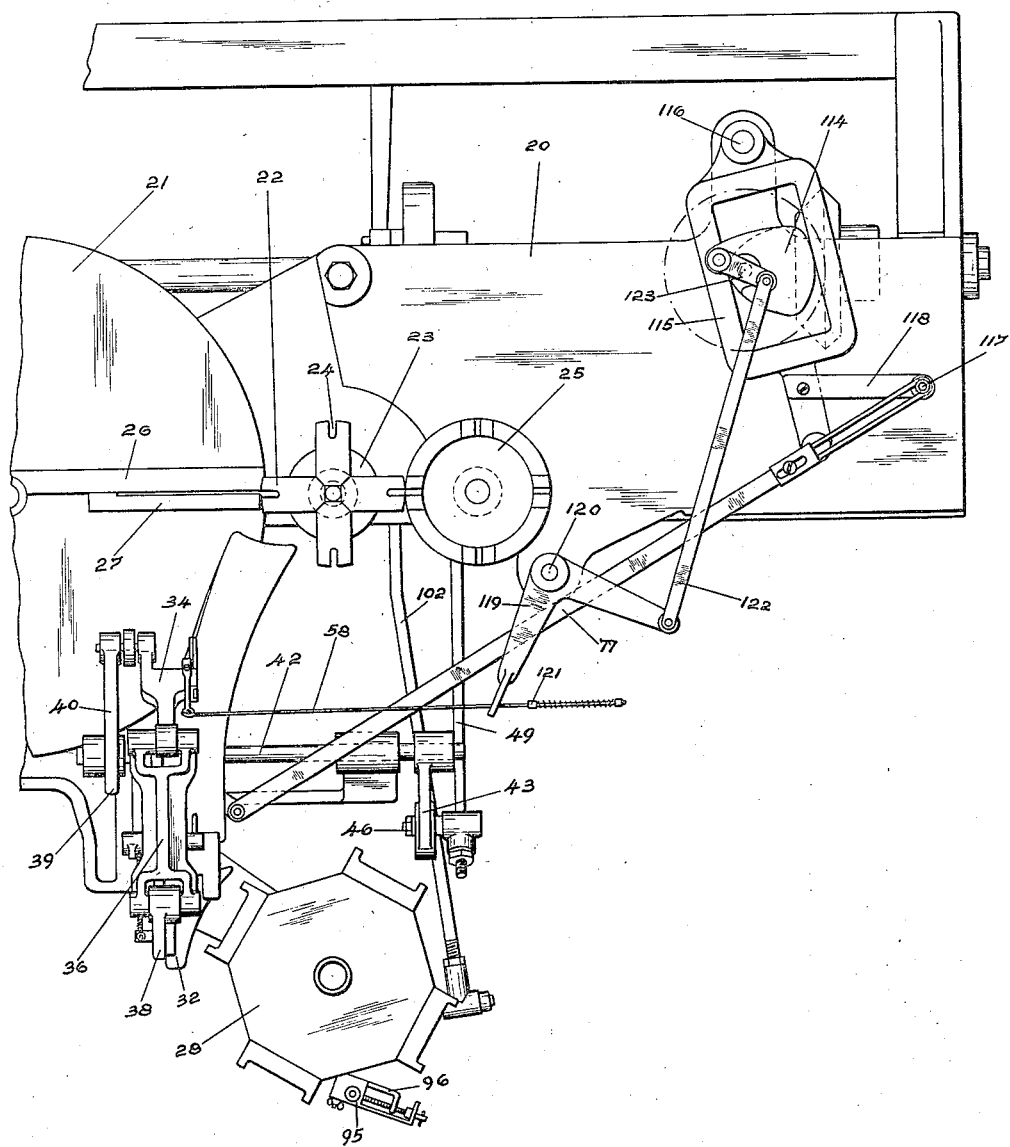

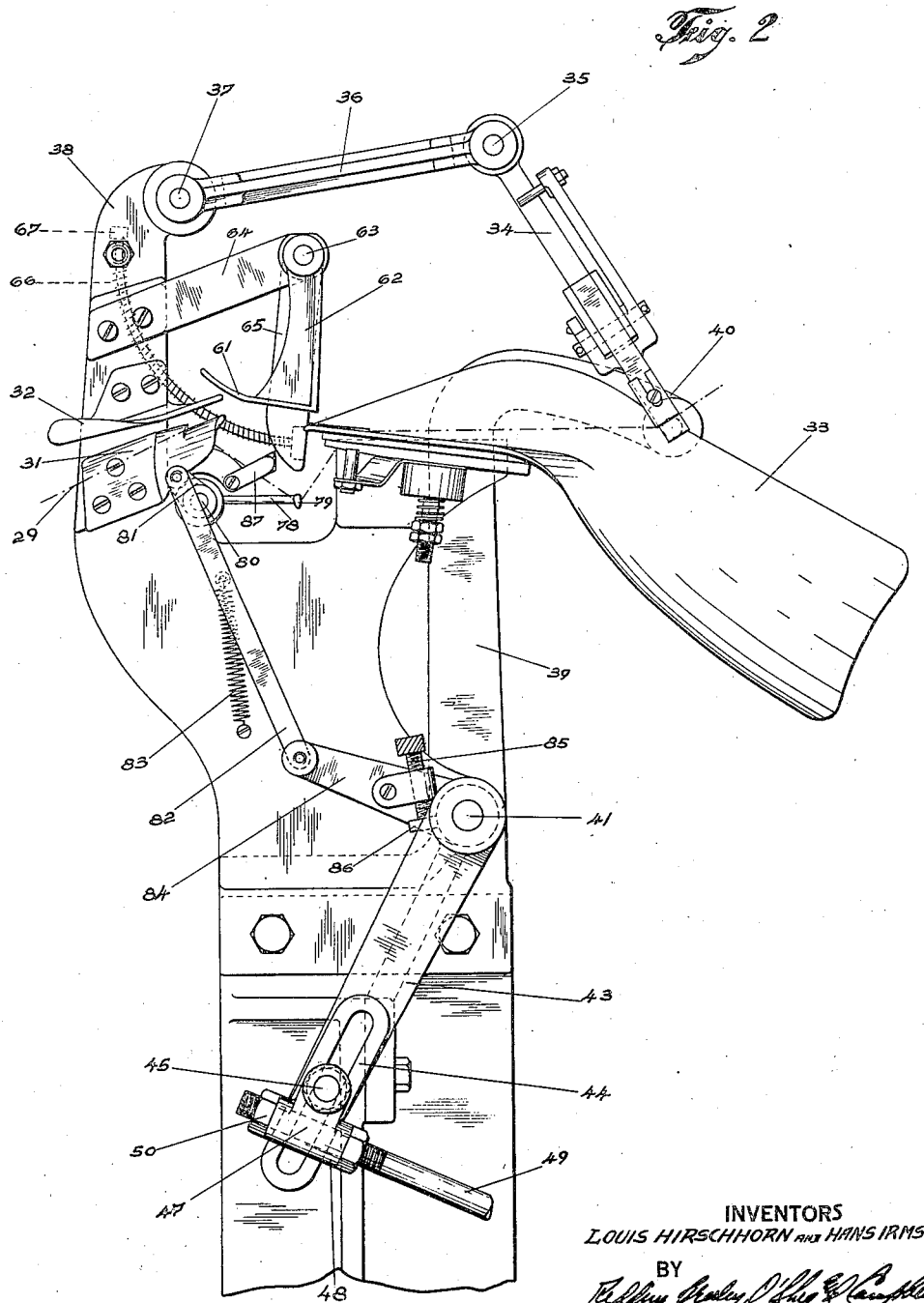

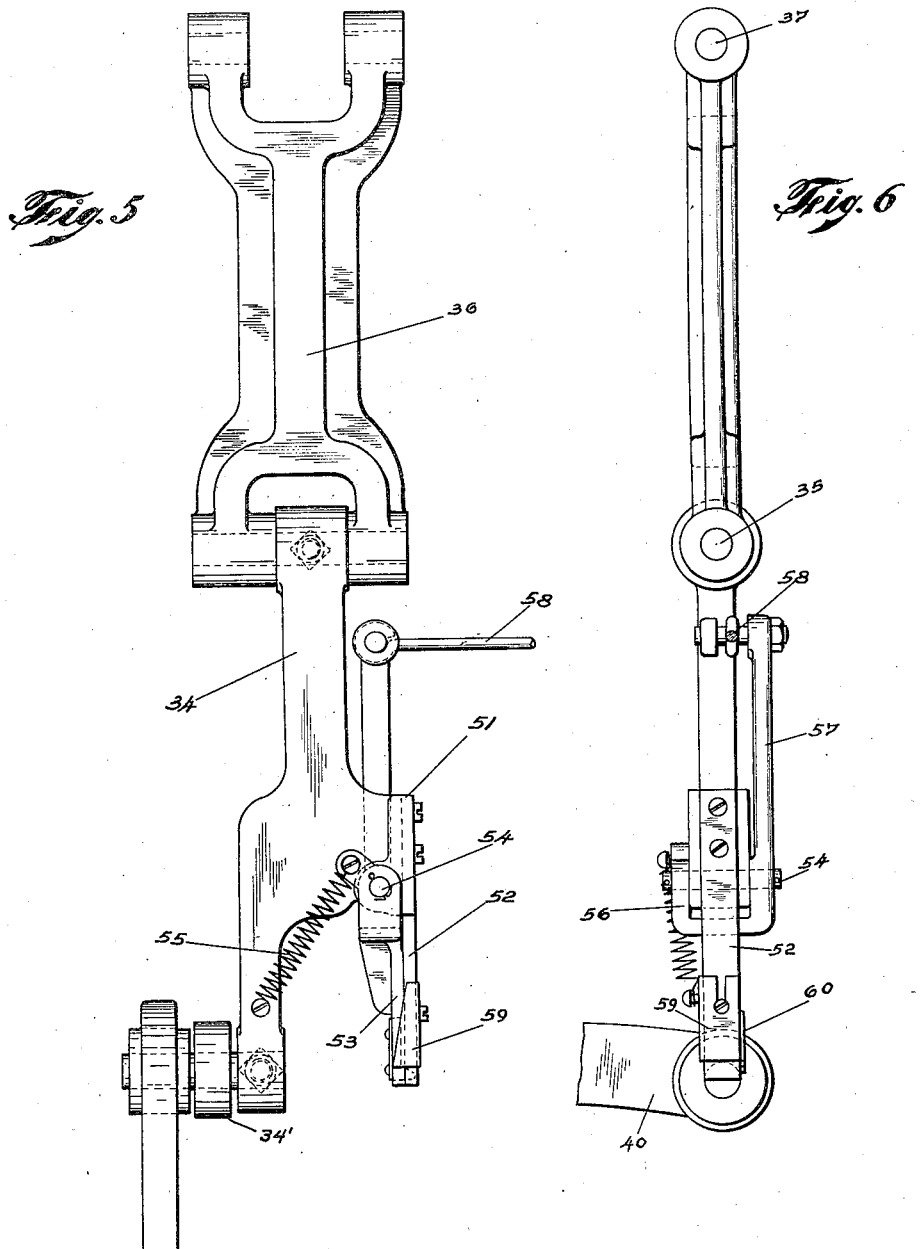

April 24, 1934. L. HIRSCHHORN ET AL 1,955,808
COMBINATION TAG FEEDING AND CUTTING MECHANISM
Filed July 13, 1932 7 Sheets-Sheet 5
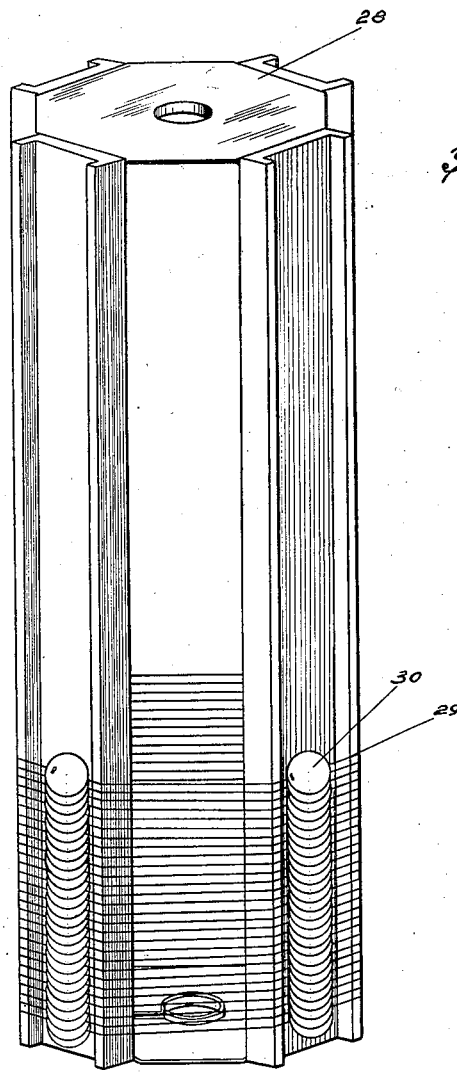
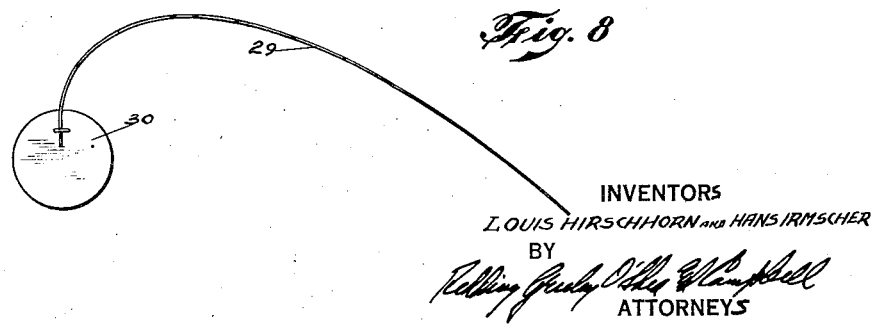
INVENTORS
LOUIS HIRSCHHORN AND HANS IRMSCHER
BY
ATTORNEYS

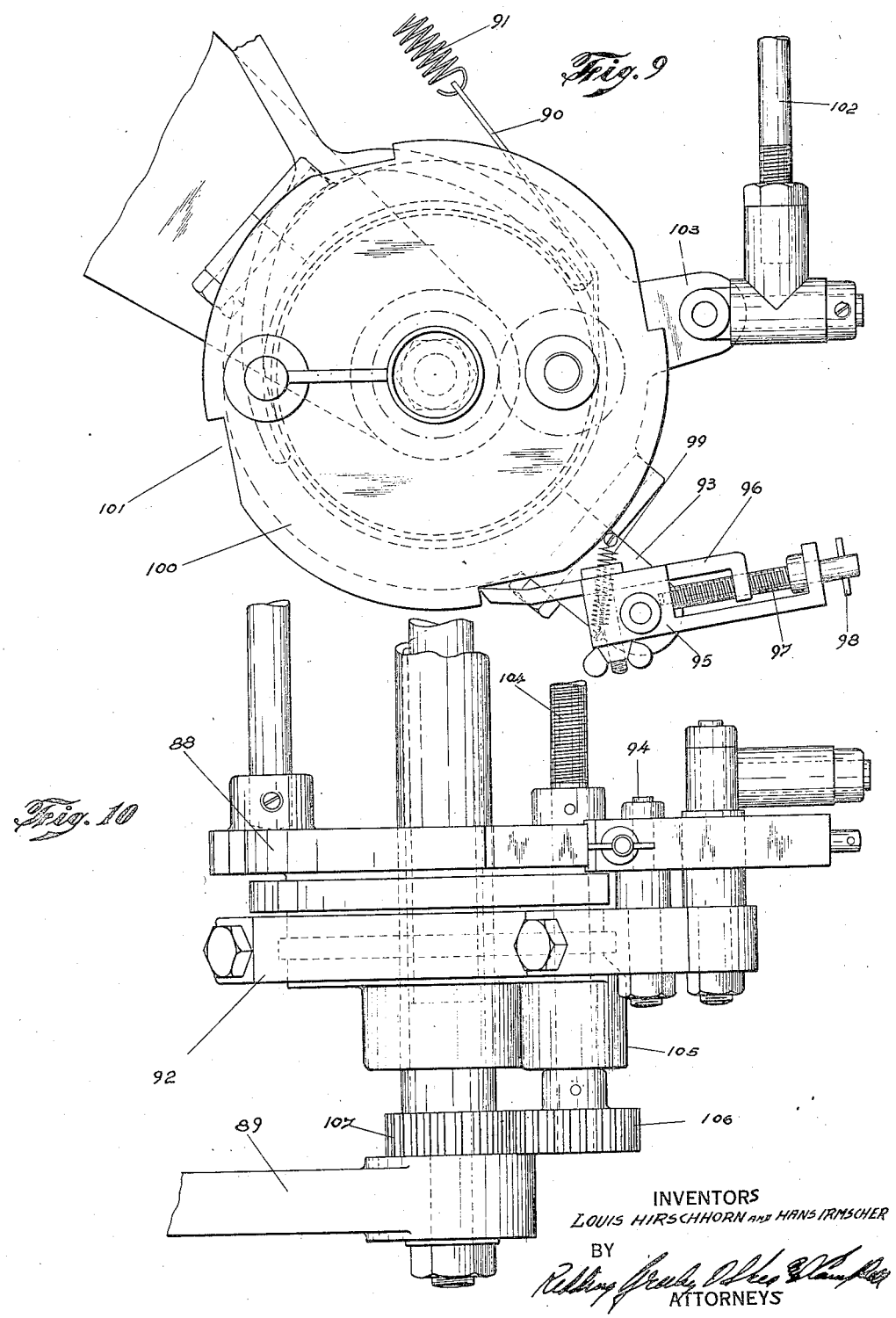

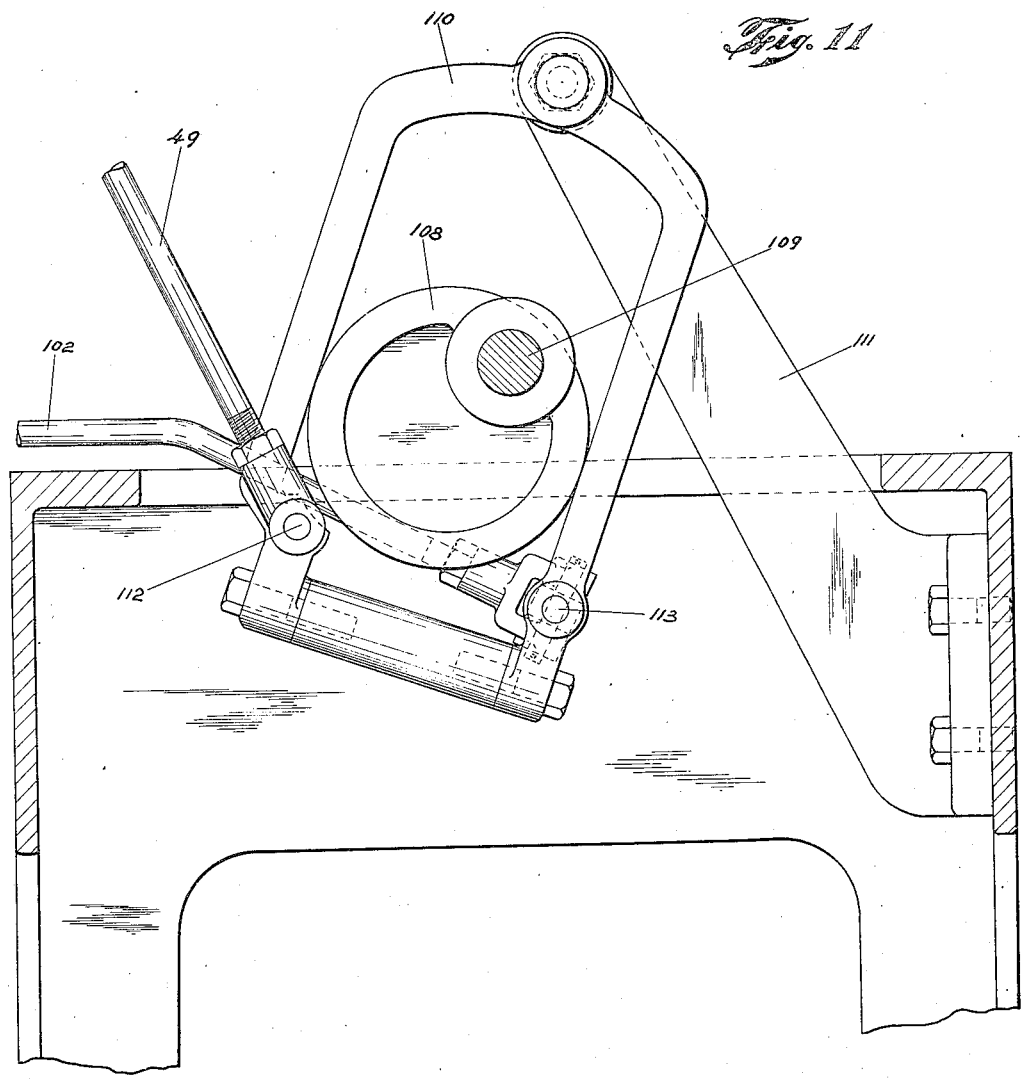

Patented Apr. 24, 1934

1,955,808

UNITED STATES PATENT OFFICE 1,955,808

COMBINATION TAG FEEDING AND CUTTING MECHANISM

Louis Hirschhorn and Hans Irmscher, New York, N. Y., assignors to Millie Patent Holding Co., Inc., New York, N. Y., a corporation of New York Application July 13, 1932, Serial No. 622,212

10 Claims. (Cl. 226—56)

The present invention relates to mechanisms for filling and closing receptacles, such as tea bags, and embodies, more specifically, a means for applying strings and tags to the bags as they are closed, whereby the handling of the bags is facilitated and suitable identifying indicia is applied thereto.

In copending applications of the present inventors mechanism is described for forming, filling, and closing bag like receptacles in which tea and other substances may be contained. The closing of these receptacles, in accordance with existing practice, takes place with the simultaneous application of strings and tags to the receptacles and, inasmuch as the present invention does not include the specific mechanism for effecting the filling and closing of the receptacles, a detailed description of such mechanism will not be included herein.

The particular mechanism for feeding strings and tags to these receptacles, however, constitutes the present invention and an object of the invention is to provide a tag feeding mechanism for feeding lengths of string upon which tags have been secured to a bag closing mechanism in a positive and effective manner.

A further object of the invention is to provide a mechanism for feeding lengths of string to a bag closing mechanism from a reel or other source upon which string bearing spaced tags has been continuously wound, the mechanism including means for severing portions of the string bearing tags in appropriate lengths.

A further object of the invention is to provide a string and tag feeding mechanism wherein means is provided for positively holding portions of the string during successive cutting and feeding operations whereby the feeding of lengths of string bearing tags from a continuous supply of string is effected in a positive manner.

Further objects, not specifically enumerated above, will be apparent as the invention is described in greater detail in connection with the accompanying drawings, wherein:

Figure 1 is a plan view of a device for feeding lengths of string to a bag closing mechanism in accordance with the present invention.

Figure 2 is a partial view in side elevation showing the string and tag feeding and cutting mechanism of Figure 1.

Figure 3 is an enlarged detail plan view of the cutting mechanism shown in Figures 1 and 2.

Figure 4 is a view in section, taken on line 4—4 of Figure 3, and looking in the direction of the arrows.

Figure 5 is a plan view of the feeding arm shown in Figures 1 and 2.

Figure 6 is a view in side elevation showing the device of Figure 5.

Figure 7 is an enlarged perspective view showing a reel upon which a continuous string bearing spaced tags is wound.

Figure 8 is a view showing a length of string bearing a tag, after having been cut by the cutting mechanism shown in Figures 3 and 4.

Figure 9 is a plan view showing the reel driving and mounting mechanism.

Figure 10 is a view in side elevation showing the mechanism of Figure 9.

Figure 11 is a plan view showing the driving mechanism for the feeding arm and reel of Figure 1.

With reference to the above drawings, a bag closing machine is shown at 20 and is provided with a rotatable table 21 upon which bags are filled and by means of which the bags are moved successively to positions in which they are moved into radial arms 22 upon a bag closing head 23. The ends of arms 22 are formed with notches 24 in which the bag-like receptacles are crimped or puckered in order that they may be clamped in a closed position by means of a suitable clamping head 25. A stationary guide member 26 serves as a guide to direct the bags into the notches 24 of arms 22 and a movable guide 27 is provided to insure proper motion of the bags into the notches 24. The foregoing elements constitute no part of the present invention and therefore need not be shown and described in further detail herein.

In order that the closing operation of the bags may include the securing of a string and tag to the respective bags, the present invention provides a string feeding and cutting mechanism which includes a reel 28 (shown in detail in Figure 7) upon which reel a continuous string 29 is wound, the string bearing tags 30, spaced along the length thereof. String from the reel is illustrated by the dot and dash line in Figure 2 and bears the reference character 29, the string being directed over a stationary guide 31 and under a spaced top guide 32 which prevents the tags 30 from being turned over during their movement through the feeding mechanism. From the stationary guide 31, the string is directed to a guide 33 which properly directs the tags while the lengths of string to which they have been secured are directed to the bag closing mechanism and between the guides 26 and 27.

Movement of the lengths of string is effected by means of an arm 34 which is pivoted at 35 to an arm 36, journaled at 37 upon a stationary bracket or standard 38. Arm 34 is moved by a lever 39 having an offset extremity 40 which is secured to the lower portion of the arm 34. In this fashion, the lower extremity of arm 34 moves in an arcuate path defined by the swinging of arm 39 about its pivot 41. This pivot comprises a shaft 42 upon which a lever 43 is secured, the lever 43 having a slotted extremity 44 in which a pivot shaft 45 is adjustably secured by means of nut 46. Pivot shaft 45 journals a fitting 47 having a recessed member 48 in which an end of a link 49 is secured by means of bolts 50.

Arm 34 is formed with an offset portion 51 upon which a relatively stationary finger 52 is secured. A movable finger 53 is pivotally mounted upon shaft 54 and normally urged against the finger 52 by means of a spring 55. The movable finger 53 is formed with a yoke-shaped extremity 56, one arm 57 of which is extended and pivotally connected to a link 58. The stationary finger 52 is provided with an offset flange 59 while movable finger 53 is provided with an offset flange 60. By means of the flanges and relatively movable fingers, the string is effectively gripped by arm 34 to enable the string to be effectively moved into the closing mechanism previously described. As arm 34 swings to the left, as viewed in Figure 2, to grasp the string 29, link 58 moves the finger 53 into an open position and, when the arm 34 has finally moved into such position that the string 29 lies between the fingers, link 58 enables spring 55 to move finger 53 in the reverse direction in order that the string may be clamped between the fingers 52 and 53.

In order that the tags secured to string 29 may not be turned over during the movement thereof into guide 33 as the arm 34 is moved to the right, as viewed in Figure 2, a guard 61 is provided, being mounted upon an arm 62 which is journaled at 63 upon a bracket 64 and actuated by an arm 65 which is engaged by roller 34' to permit the last named arm to move into a string engaging position. A spring 66 is mounted upon a guide rod 67 to urge the guard 61 into the normal position shown in Figure 2. In such position, the guard prevents the tags which are secured to string 29 from being turned over during the movement thereof from guide 31 to guide 33.

After the arm 34 has been moved into the position shown in Figure 2, the length of string between the arm 34 and the following tag which is secured to string 29 is severed from the remaining string by means of a cutting mechanism illustrated in detail in Figures 3 and 4. This mechanism comprises a stationary shear blade 68 which is secured beneath the guide 33 and at one side of a slot 69 formed in such guide. A movable blade 70 is journaled at 71 upon a shaft 72, a bushing 73 being provided against which a spring 74 engages to urge the movable blades 70 upwardly, positioning nuts 75 being provided to afford a seat for the spring 74. Blade 70 is actuated by an arm 76 which is formed upon bushing 73 and link 77 serves to reciprocate the arm 76 and blade 70 in a fashion to be described hereinafter.

Prior to the cutting operation performed by the mechanism shown in Figures 3 and 4, slack is formed in the length of string between the cutting mechanism and the guide 31. This slack is formed by an arm 78 which is formed with an offset engaging extremity 79 and mounted upon a shaft 80. Shaft 80 is provided with a crank arm 81 to which a link 82 is connected, a spring 83 normally urging the link and arm 78 into a retracted position. The arm 78 is moved into a string engaging position by means of an arm 84 which is journaled upon shaft 41 and which receives movement therefrom through an adjustable set screw 85, mounted upon arm 84, and engaging a lug 86 which is formed upon or movable with shaft 41. As arm 78 moves downwardly into engagement with the string, the string is moved into the position indicated in Figure 2. During the movement in such position, the string is forced between spring clamping fingers 87 in order that the length of string between such fingers and the guide plate 31 may be maintained in a sufficiently taut condition. In this condition, fingers 52 and 53 may effectively engage the string and insure the proper operation of the mechanism.

In order that no tension may be placed upon the string 29, the reel 28, upon which the string is mounted, is actuated in such fashion as to deliver string therefrom as rapidly as required by the operation of the string feeding mechanism. Figures 9 and 10 illustrate a mechanism for delivering string from the reel in such fashion, the mechanism including a reel supporting member 88 which is rotatably mounted upon an arm 89. The reel supporting member is provided with a cylindrical braking surface which is adapted to be engaged by a flexible brake band 90 urged against the braking surface by means of a spring 91. Rotatably mounted upon the reel supporting member 88 is a ring 92 upon which an arm 93 is formed. Arm 93 is provided with a vertically extending stub shaft 94 upon which a pawl carrier 95 is journaled, the pawl carrier being provided with a pawl 96 upon a threaded shaft 97 which is adjustable by means of a manually operated handle 98. A spring 99 is connected between the arm 93 and carrier 95 and normally maintains the pawl 96 against the periphery of a disc 100 which is provided with spaced notches 101.

Oscillation of ring 92 is effected by means of a link 102 which is pivotally connected to an arm 103 formed upon the ring 92. As the reel supporting device 88 is thus stepped about in a unidirectional intermittent fashion, axial movement is imparted to the reel supporting device by means of a threaded shaft 104 which is journaled in a bushing 105, formed eccentrically to the supporting device 88. A gear 106 is secured to the lower end of shaft 104 and engages a stationary gear 107 which is formed upon arm 89. As the reel supporting device 88 is rotated, shaft 104 is turned to cause the reel 28 to be advanced axially along the reel supporting device.

Reciprocating motion is imparted to shafts 49 and 102 by means of a boxed cam 108 which is mounted upon a driving shaft 109. A box 110 is pivoted upon a stationary bracket 111 and mounted over cam 108, links 49 and 102 being connected to the cam at 112 and 113, respectively.

The actuating means for the cutting mechanism and the finger operating mechanism comprises a rotatable cam 114 which is boxed by a cam box 115 which is pivotally mounted at 116. Link 77 is pivoted at 117 to an arm 118 on the cam box, the oscillating motion of box 115 thus being transmitted to the movable cutter blade 70.

Link 59 is actuated by a bell crank lever 119 which is pivoted at 120 and provided with an arm having an aperture through which link 58 passes.

This arm strikes a yielding stop 121 to open the fingers, motion of the bell crank lever being effected by means of a link 122 which is connected to an arm 123, secured to the cam 114.

The mechanism for adjusting pawl 96 serves as a means for adjusting the length of string fed from the reel in as much as the degree of motion imparted to the reel supporting member 88 by link 102 may be varied by means of this mechanism. The length of string thus fed from reel 28 is directed over guide 31 and arm 34 grasps the string and draws it over the adjacent end of guide 33 and through the slot 69 formed therein. The tag secured to the string adjacent the end thereof is thus placed upon the horizontal portion of the guide 33 and the arm 78 is then actuated to draw the length of string between guides 31 and 33 downwardly into engagement with the spring fingers 87. The cutting mechanism is then actuated to sever the length of string and tag upon guide 33 from the remaining string and the feeding operation by means of which the string and tag are supplied to the tag closing mechanism is then completed. From the foregoing, it will be seen that an effective mechanism has been provided for feeding lengths of string bearing tags to a bag closing device, the feeding mechanism operating positively and effectively to cut successive lengths of string bearing tags and control the movement thereof to prevent the tags from turning over during such operation.

While the invention has been described with specific reference to the accompanying drawings, it is not to be limited, save as defined in the appended claims.

We claim as our invention:

1. Means for supplying a continuous string or flexible element having a plurality of tags secured at spaced points along the length thereof, means to actuate the supplying means to supply the element, a guide over which the element passes, means to engage the element and draw the same over the guide, and means to cut the element between the engaging means and guide.

2. Means for supplying a continuous string or flexible element having a plurality of tags secured at spaced points along the length thereof, means to actuate the supplying means to supply a required length of the element intermittently, a guide over which the element passes, means to engage the element and draw the same over the guide, and means to cut the element between the engaging means and guide.

3. Means for supplying a continuous string or flexible element having a plurality of tags secured at spaced points along the length thereof, a guide over which the element passes, an arm movable from adjacent the guide to a point to which the element is to be supplied, relatively movable fingers on the arm, means to move the fingers to open and closed positions, and means to cut the element between the guide and point to which the element is to be supplied.

4. Means for supplying a continuous string or flexible element having a plurality of tags secured at spaced points along the length thereof, a guide over which the element passes, a guide to which the element is delivered, an arm movable from adjacent the guide to a point to which the element is to be supplied, means on the arm to engage the element, and a yielding guard between the guides to position the tags on the element as they are moved between the guides.

5. Means for supplying a continuous string or flexible element having a plurality of tags secured at spaced points along the length thereof, a guide over which the element passes, a guide to which the element is delivered, an arm movable from adjacent the guide to a point to which the element is to be supplied, means on the arm to engage the element, a guard between the guides to position the tags on the element as they are moved between the guides, and means to urge the guard yieldingly into a normal guarding position, the guard being engaged by the arm and moved to a retracted position upon movement of the arm into an element engaging position.

6. Means for supplying a continuous string or flexible element having a plurality of tags secured at spaced points along the length thereof, a guide over which the element passes, an arm movable from adjacent the guide to a point to which the element is to be supplied, relatively movable fingers on the arm, means to cut the element between the engaging means and guide, and means to move the fingers into a closed position adjacent the engaging means and an open position upon movement of the arm away from the engaging position.

7. Means for supplying a continuous string or flexible element having a plurality of tags secured at spaced points along the length thereof, a guide over which the element passes, an arm movable from adjacent the guide to a point to which the element is to be supplied, a stationary finger on the arm, a finger pivoted adjacent the first finger and adapted to move thereagainst, a spring to urge the last named finger against the first finger, means to separate the fingers, and means to cut the element between the guide and point to which the element is to be supplied.

8. Means for supplying a continuous string or flexible element having a plurality of tags secured at spaced points along the length thereof, a guide over which the element passes, an arm movable from adjacent the guide to a point to which the element is to be supplied, a stationary finger on the arm, a finger pivoted adjacent the first finger and adapted to move thereagainst, offset flanges on the fingers, a spring to urge the last named finger against the first finger, means to separate the fingers, and means to cut the element between the guide and joint to which the element is to be supplied.

9. Means for supplying a continuous string or flexible element having a plurality of tags secured at spaced points along the length thereof, a guide over which the element passes, means to engage the element and draw the same over the guide, a guide over which the element passes from the first guide, a slot in the last named guide, and a cutting means under the slot.

10. Means for supplying a continuous string or flexible element having a plurality of tags secured at spaced points along the length thereof, a guide over which the element passes, means to engage the element and draw the same over the guide, a guide over which the element passes from the first guide, a slot in the last named guide, a stationary cutting blade to one side of the slot, a movable cutting blade associated with the first blade and normally disposed upon the other side of the slot therefrom, and means to actuate the movable blade.

LOUIS HIRSCHHORN,
HANS IRMSCHER.